US005144566A

United States Patent [19]

Anderson et al.

[11] Patent Number: 5,144,566

[45] Date of Patent: Sep. 1, 1992

[54] METHOD FOR DETERMINING THE QUALITY OF PRINT USING PIXEL INTENSITY LEVEL FREQUENCY DISTRIBUTIONS

[75] Inventors: John K. Anderson, Garland; Michael S. Andrews; Robert S. Briggs, Jr., both of Richardson; David M. Keathly, Dallas, all of Tex.

[73] Assignee: Comar, Inc., Richardson, Tex.

[21] Appl. No.: 538,202

[22] Filed: Jun. 14, 1990

[51] Int. Cl.[5] .......................... G06F 15/20; G06K 9/66

[52] U.S. Cl. .................................... 364/552; 364/555; 382/8; 382/18; 382/51

[58] Field of Search ...................... 382/18, 51, 1, 34, 8; 358/101, 106; 364/518, 526, 552, 555

[56] References Cited

U.S. PATENT DOCUMENTS

| | | | |
|---|---|---|---|
| 3,648,048 | 3/1987 | Dorn et al. | 364/526 |
| 4,165,465 | 8/1979 | Kanatani et al. | 250/559 |
| 4,198,739 | 4/1990 | Lorente et al. | 382/18 X |
| 4,472,736 | 9/1984 | Ushio et al. | 364/526 X |
| 4,488,808 | 12/1984 | Kato | 356/73 |
| 4,561,103 | 12/1985 | Horiguchi et al. | 382/1 |
| 4,637,054 | 1/1987 | Hashim | 382/18 X |
| 4,677,680 | 6/1987 | Harima et al. | 382/1 |
| 4,685,139 | 8/1987 | Masuda et al. | 382/1 |
| 4,735,323 | 4/1988 | Okada et al. | 382/18 X |
| 4,807,163 | 2/1989 | Gibbons | 364/555 X |
| 4,847,786 | 7/1989 | Wang et al. | 364/518 |
| 4,872,024 | 10/1989 | Nagai et al. | 358/101 X |
| 4,941,192 | 7/1990 | Mishima et al. | 382/18 X |
| 5,010,578 | 4/1991 | Siener et al. | 382/18 X |
| 5,060,290 | 10/1991 | Kelly et al. | 382/18 |
| 5,086,485 | 2/1992 | Lin | 382/51 |

*Primary Examiner*—Parshotam S. Lall

*Assistant Examiner*—Thomas S. Auchterlonie

*Attorney, Agent, or Firm*—Ross, Howison, Clapp & Korn

[57] ABSTRACT

A print inspection method in which an area of printed material is optically scanned to obtain image data representing picture elements having variable intensity levels includes counting the number of picture elments at a particular intensity level in the area scanned to thereby generate a frequency distribution of the intensity level of the image data in the area scanned. The frequency distribution generated is compared to a stored reference frequency distribution of intensity levels of the image data. A statistical comparison with the reference data is utilized to determine whether or not the printed material is satisfactory.

6 Claims, 3 Drawing Sheets

METHOD FOR DETERMINING THE QUALITY OF PRINT USING PIXEL INTENSITY LEVEL FREQUENCY DISTRIBUTIONS

TECHNICAL FIELD OF THE INVENTION

The present invention relates to print inspection methods, and more particularly, to a method for monitoring ink density and defects of newsprint.

BACKGROUND OF THE INVENTION

A variety of print inspection devices and methods have been proposed. In one such method, tone marks or color patches printed in the marginal portion of prints have been inspected to determine the acceptability of the prints. Devices and methods have been proposed in which data has been obtained from a printed pattern by utilizing a single sensor to input the data of the entire area of the printed material. Other devices utilize various scanning methods; however, these methods do not monitor large area print with high accuracy. Additionally, such methods require a large amount of data to be processed and are not sufficient for large area print inspection at high data rates.

Other methods for print inspection involve a comparison system in which reference data is compared with scanned surface data to determine the print acceptability. A comparison system in which reference data is compared with the previous inspection data again requires a large amount of processing time which is not compatible with present day high speed rotary printing presses.

A need has thus arisen for a print inspection method for monitoring the ink density levels of newsprint areas and detecting defects within those areas which can be accomplished at high printing press speeds and which compare actual measured values against a set of internal or user criteria.

SUMMARY OF THE INVENTION

In accordance with the present invention, a print inspection method in which an area of printed material is optically scanned to obtain image data representing picture elements having variable intensity levels is provided. The method includes counting the number of picture elements at a particular intensity level in the area scanned to thereby generate a frequency distribution of the intensity level of the image data in the area scanned. The frequency distribution generated and selected features from the frequency distribution are compared to a stored reference frequency distribution of intensity levels of the image data and selected features from the reference data. A statistical comparison with the reference data is utilized to determine whether or not the printed material is satisfactory.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
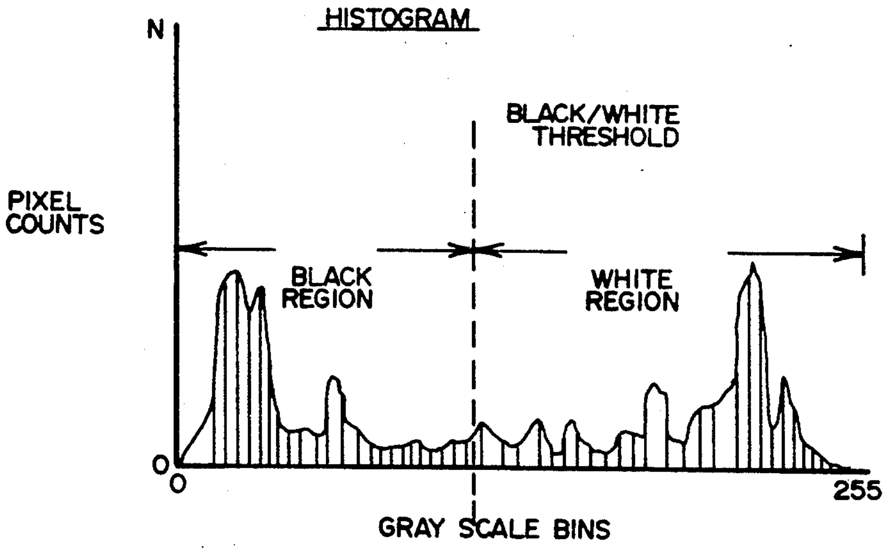
FIG. 1 is a graph illustrating a histogram created by the present method.

The present method for print inspection monitors the ink density levels of newsprint by generating a histogram of the number of picture elements (pixels) at a particular intensity level of ink. FIG. 1 illustrates a histogram generated in accordance with the present invention. Ink intensity levels are represented by gray scales, 0 through 255, zero representing black and 255 representing white which is shown on the horizontal axis. The frequency corresponding to each intensity level representing the number of pixel counts is displayed on the vertical axis of the histogram as 0 through N pixels. Pixels representing the 256 gray scales are counted and stored in 256 bins. When generating the histogram in accordance with the present invention, the amount of data to be processed is significantly reduced as only the frequency distribution of pixels for particular intensity levels is processed rather than individual pixels for the entire image scanned. Comparisons to reference data is based upon the histogram and not a pixel-by-pixel comparison as utilized in prior print inspection systems and methods.

Image data acquisition for the present method can be accomplished utilizing a sensor array having eight, 512 element charge couple devices to image a moving web of newsprint. An incremental encoder is used to command the sensor array to capture an area of the web for example, every 1.4 millimeters. The sensor array will thereby acquire 818 lines of data for every rotation of the impression cylinder. Each line will contain, for example, 1024 pixels. A data frame to be subsequently analyzed represents 1024 pixels by 818 lines.

Figure 2:
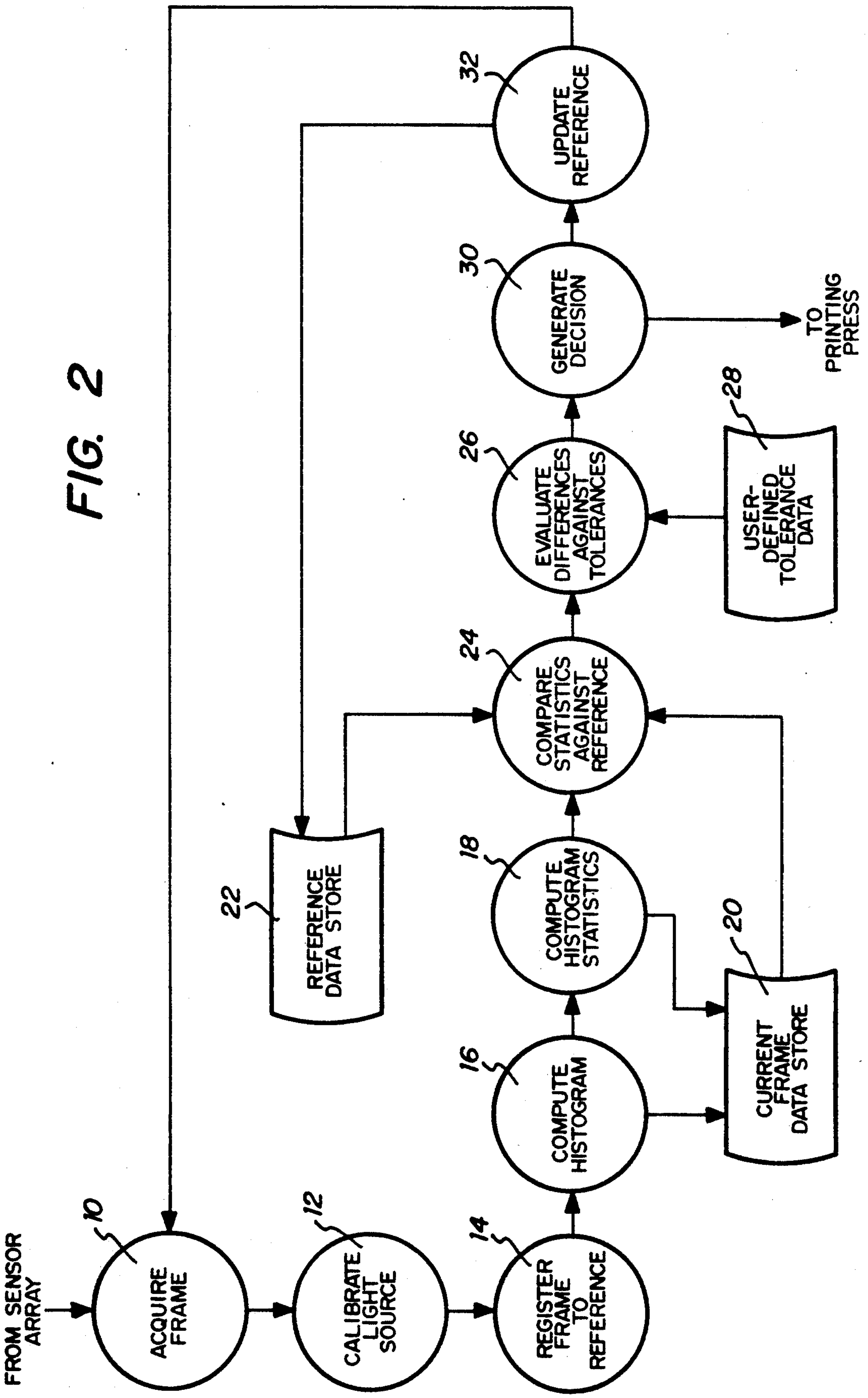
FIG. 2 is a functional flow diagram illustrating the steps of the method of the present invention.

FIG. 2 illustrates a process flow diagram of the present method. The data from the sensor array is captured one frame at a time for statistical analysis through the remainder of the processing cycle. The acquisition of the sensor data is controlled by the encoder on the rotating drive shaft of the printing press, and thus the acquisition rate is dependent on the rotation speed of the press. The data for each frame is acquired at step 10. Once acquired, selected regions of the image frame are analyzed to calibrate the light source utilized in the image acquisition subsystem at step 12 for future data acquisition. This process is repeated periodically throughout the processing cycle. The acquired frame is then registered at step 14 to the position of the stored reference histogram data in order to remove any error that may result from horizontal or vertical drifting of the print under the sensor array. This step is necessary to ensure the accuracy of the statistical analysis and comparisons to be performed within the present method.

Once these initial activities have been performed, the histogram of the present method for the captured frame is computed at step 16. The image frame is dissected into several equally sized regions over which separate histograms are computed. This dissection improves the present method's ability to resolve small defects as well as in aiding in isolating the location of errors for reporting purposes. Once the histograms have been obtained, various statistics are computed which characterize the histograms at step 18. These statistics may include, for example, minimum and maximum values, thresholds and moment-related values. The histogram computed and the statistics are stored in a memory at step 20. Reference data in the form of a histogram is stored at step 22.

At step 24, the reference data is compared to the current frame data to determine the magnitude of any errors that are present within the area scanned. These differences are evaluated at step 26 in light of internal and user defined tolerances created at step 28 to determine if an alarm message or rejection signal is warranted at step 30 to generate an output to the printing press. The current frame histograms and statistics are then merged at step 32 with the reference data stored at step 22 utilizing a weighted averaging technique that results in a "moving window" reference. This merging improves noise immunity as well as providing an ability to adapt to changes in the paper stock, light levels and other external environmental parameters.

Figure 3:
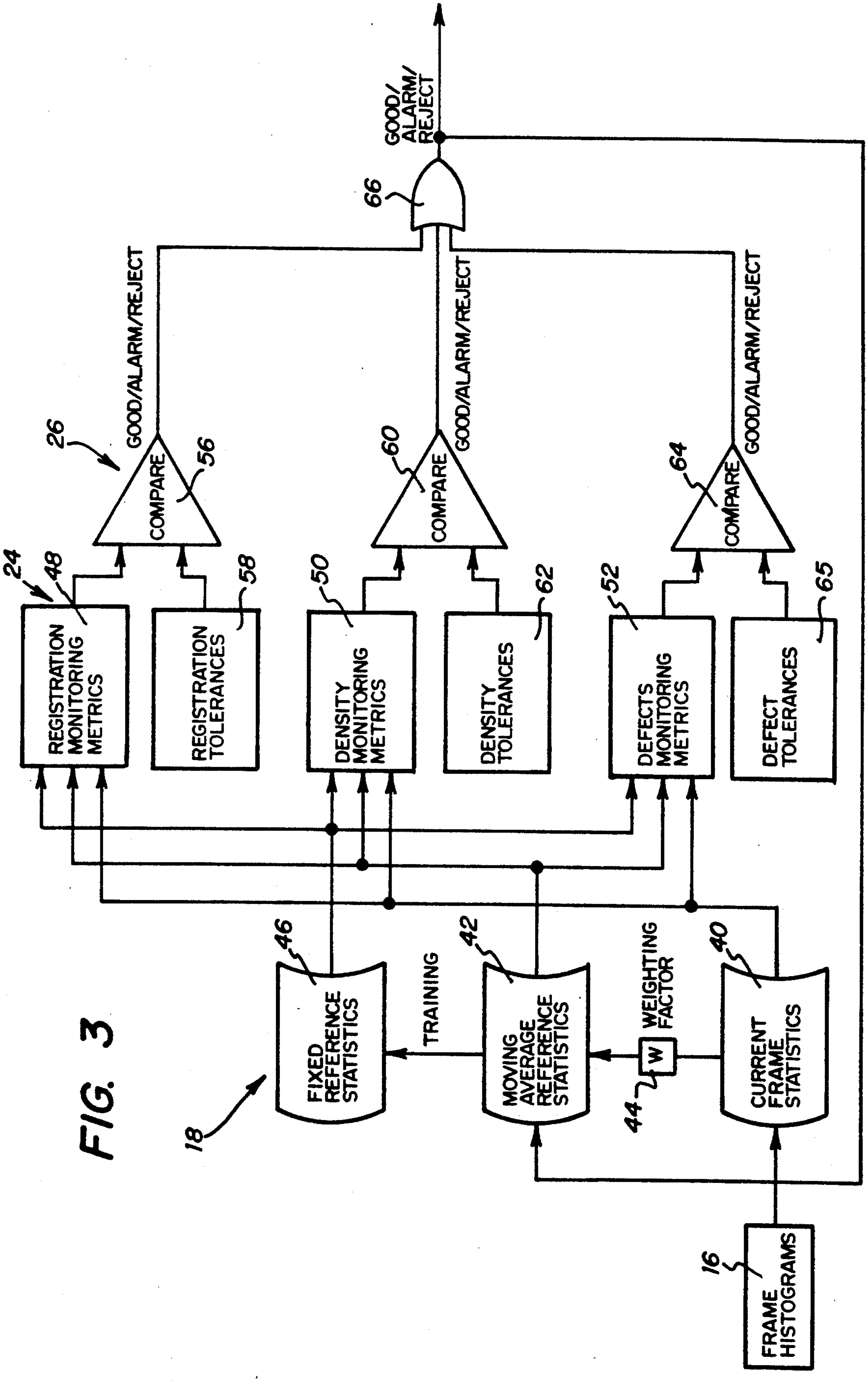
FIG. 3 is a functional block diagram of the comparison step of the method of the present invention.

Referring now to FIG. 3, a more detailed discussion of steps 18, 24 and 26 (FIG. 2) will now be provided. The present method utilizes three sets of statistics derived from image frames in order to analyze the printed material and generate appropriate decisions. The current frame statistics at block 40 represent the latest data captured from the image sensor. The moving average reference statistics, block 42, comprise a "past history" of the image sensor data and are computed by averaging a weighted version of the current frame statistics with the existing moving average reference data. A weighting function 44 is such that the past history represents a "window" over the past frames with the weight adjustable to control sensitivity to long-term changes. This weighted average improved stability and noise immunity over prior methods that compare adjacent frames, or correlate incoming data with a fixed or static reference. The fixed reference statistics, block 46, represent thresholds and reference averages that are computed during a "training" phase of the process. These values also contribute to the decision making process in defining the characteristics of an acceptable copy.

The current frame statistics 40, moving average reference statistics 42 and fixed reference statistics 46 are utilized in performing three general monitoring functions including registration monitoring 48, density monitoring 50, and defect monitoring 52. Each of these monitoring functions are performed by statistical processing techniques. The registration monitoring function 48 determines the size of both the running direction, vertical, and cross-direction, horizontal, margins. A comparison is performed at step 56 between these measured statistics and registration tolerances provided by the operator at step 58.

The density monitoring function 50 serves to examine the darkest ink values and the lightest background paper values to ensure that these values remain within specified tolerances. A comparison is made at step 60 with internal and user defined tolerances for density defined at step 62. Changes in ink level may indicate problems with the ink distribution mechanism and can be associated with either excessive or insufficient inking. Changes in the white density level may indicate a general "graying" of the background paper associated with conditions known as "tinting" and "scumming".

The defect monitoring function 52 serves to examine the printed material for ink spots, wrinkles, holes or other localized defects on individual pages. Comparisons are made at step 64 to internal and user defined defect tolerances defined at step 66 which define relative size and quantity of these types of defects that are acceptable as well as the levels which will result in the generation of an alarm or reject condition.

The results of the comparisons performed at steps 56, 60, and 64 are combined at step 66 to generate an output indicating satisfactory or unsatisfactory ink density levels based upon the statistical analysis of the histogram data from each frame acquired through the image acquisition sensor array. The output may be in the form of, for example, a reject signal or alarm indicating to the operator a potential problem. The output of the comparison is also utilized to update the moving average reference statistics at step 42.

Figure 4:
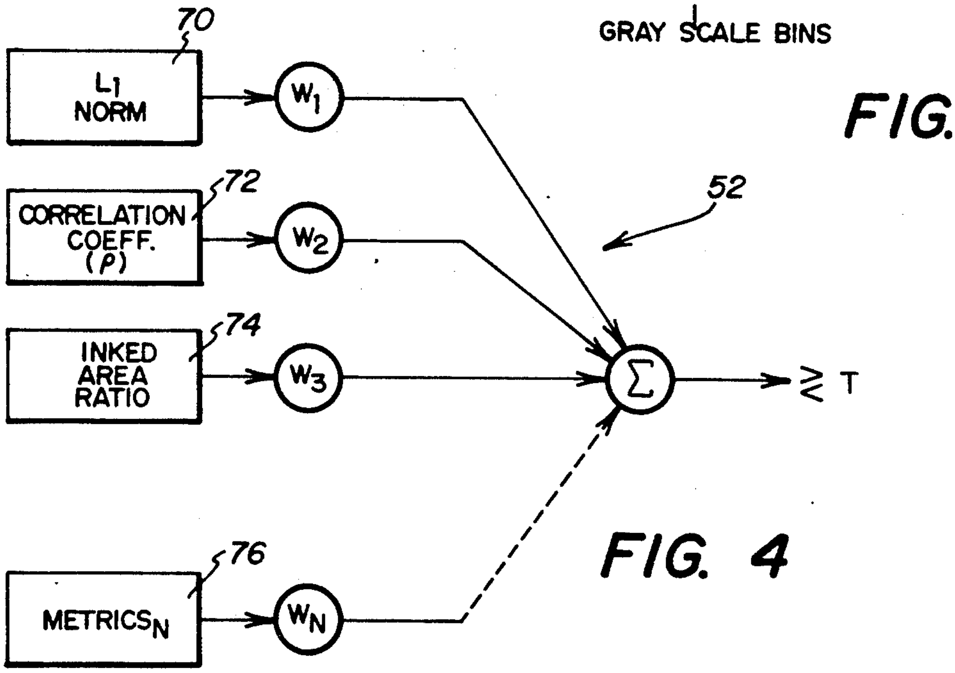
FIG. 4 is a functional block diagram illustrating the defect metrics combination step of FIG. 3.

FIG. 4 illustrates a block diagram representing the steps performed by the defect monitoring statistics, step 52. Various types of statistical analyses are performed on the frame histogram such as, for example, computation of the $L_1$ norm, correlation coefficient, and inked area ratio. These defect monitoring metrics are represented by blocks 70, 72, 74, and 76. Each statistical analysis performed on the frame histogram data is weighted to define the contribution each metric makes to the final decision. T represents the set of user-defined thresholds for alarm and reject levels.

$L_1$ norm is defined as:

$$L_1 = |H_R - H_c| \text{ Vector Form} \quad (1)$$

$$L_1 = \sum_{i=1}^{N} |h_{Ri} - h_{ci}| \text{ Point Form} \quad (2)$$

Where:

$L_1$ is the $L_1$ norm value computed $H_R$ is the reference histogram $h_{Ri}$ is the ith element of the reference histogram $H_c$ is the incoming (current) histogram $h_{ci}$ is the ith element of the current histogram.

$L_1$ norm is further described in E. R. Dougherty and Charles R. Giardina, *Mathematical Methods for Artificial Intelligence and Autonomous Systems*, p. 319, Prentice-Hall, Englewood Cliffs, N.J. 1988, which is incorporated by reference.

Correlation coefficient is defined as:

$$\rho = \frac{\Sigma\, \overline{H}_R \overline{H}_C}{\sqrt{\Sigma\, H_R^2\, \Sigma\, H_C^2}} \quad (3)$$

$$\overline{H}_R = H_R - \mu_{HR} \quad (4)$$

$$\overline{H}_C = H_C - \mu_{HC} \quad (5)$$

Where:

$\rho$ is the correlation coefficient $H_R$ is the reference histogram $H_c$ is the current incoming histogram $\mu$ is the mean of the appropriate histogram.

Correlation coefficient is further described in J. B. Kennedy and Adam M. Neville, *Basic Statistical Methods for Engineers and Scientists, 3rd Ed.*, pp. 410–411, Harper & Row, New York, 1986, which is incorporated herein by reference.

Inked area ratio is defined as:

$$IAR = \frac{\sum_{i=0}^{B/W\ Threshold} h_{ci}}{\sum_{i=0}^{255} h_{ci}} \quad (6)$$

Where:

IAR is the inked area ratio metric $h_{ci}$ is the ith element of the current incoming histogram.

Density monitoring statistics performed at step 50 represent density changes as follows:

$$\left|\begin{matrix}\text{Max. Black Level} \\ \text{(current frame)}\end{matrix} - \begin{matrix}\text{Max. Black Level} \\ \text{(reference)}\end{matrix}\right| \begin{matrix}> \\ <\end{matrix} T_{black} \quad (7)$$

$$\left|\begin{matrix}\text{Max. White Level} \\ \text{(current frame)}\end{matrix} - \begin{matrix}\text{Max. White Level} \\ \text{(reference)}\end{matrix}\right| \begin{matrix}> \\ <\end{matrix} T_{white} \quad (8)$$

Where:

$T_{black}$, $T_{white}$ are user-defined thresholds for alarm and reject levels.

The frame histogram is weighted with a set of weighting factors which favor the black and white regions, respectively. The moment of the weighted histograms are computed and compared against trained reference data. This statistical analysis detects shift in the major black or white regions due to tinting, scumming, and similar defects.

The registration monitoring statistics performed at step 48 is accomplished utilizing intensity profiles computed in the direction perpendicular to the direction for which registration information is desired. To determine vertical, or running direction, registration, the intensity values across the horizontal rows are summed, forming a set of intensities.

$$I_{vj} = \sum_{i=1}^{m} P_{ji} \quad (9)$$

$$1 \leq j \leq n$$

Horizontal registration is determined utilizing vertical columns $$I_{Hi} = \sum_{j=1}^{m} P_{i,j} \quad (10)$$

$$1 \leq i \leq n$$

Where $P_{ji}$ is the pixel intensity for the ith pixel in row j.

Figure 5:
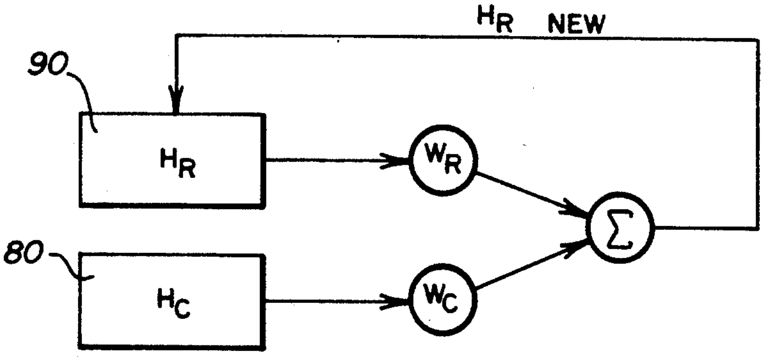
FIG. 5 is a block diagram illustrating the reference data generation step of the present invention.

FIG. 5 illustrates the steps performed at the reference data storage memory 22 (FIG. 2). Block 80 represents the histogram for the current frame. The frames are weighted and summed to create the new reference histogram at block 90. The new reference histogram can be calculated according to the following equation:

$$H_{Rnew} = \frac{N-1}{N}(H_R) + \frac{1}{N}(H_C) \quad (11)$$

Where:

$H_c$ is the histogram for the current frame

N is the number of frames in the averaging window $H_{Rnew}$ is the new reference histogram.

It therefore can be seen that the present invention provides for a print inspection method utilizing a histogram for the analysis of ink density, ink area ratios, and detection of defects. Statistical analysis is performed upon the histogram data which is compared with stored reference data to determine whether the print is of acceptable quality.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method for determining the quality of print in a printing press operation, the printing press operating to print a plurality of copies of material on a moving web, the method determining the print quality of the plurality of the copies of the material on the moving web, comprising the steps of:

providing an optical scanner having an illumination level for illuminating said moving web;

continuously moving said web past said optical scanner;

optically scanning an area of each of said plurality of copies of the material printed on said moving web as the copies are being printed by said printing press to obtain image data representing picture elements having variable intensity levels;

dividing said optically scanned areas into a plurality of subareas;

counting said number of picture elements at a particular intensity level for each of said plurality of subareas to thereby generate a frequency distribution of the intensity levels for each of said plurality of subareas for each of said plurality of copies of the material printed on said moving web scanned by said scanner within a predetermined time period;

generating a reference frequency distribution based upon one of said plurality of subareas for one of said plurality of copies of the material printed on said moving web within said predetermined time period;

storing said reference frequency distribution;

comparing said stored reference frequency distribution to each of said frequency distributions for each of said subareas on each of said plurality of copies of the material printed on said moving web to generate an output determinative of whether each of the plurality of copies is satisfactory when compared to said one of said plurality of copies within said predetermined time period;

generating an average frequency distribution based upon said plurality of copies of the material scanned by said scanner within said predetermined time period;

storing said average frequency distribution; and comparing said stored average frequency distribution to the frequency distribution of a copy of the material printed on said moving web next scanned by said scanner after said predetermined time period to generate an output determinative of whether said next scanned copy is satisfactory when compared to said plurality of copies of the material printed on said moving web and scanned within said predetermined time period.

2. The method of claim 1 and further including:

monitoring said illumination level;

monitoring the amount of light reflected from said moving web and received by said optical scanner; and applying weighting factors to said reference frequency distribution based upon changes in said illumination level and changes in said amount of light received by said optical scanner.

3. The method of claim 1 and further including:

monitoring the position of said plurality of said subareas as said web moves past said optical scanner; and modifying said reference frequency distribution and said average frequency distribution based upon changes in position of said subareas.

4. The method of claim 1 and further including:

statistically analyzing said reference frequency distribution and said average frequency distribution to detect both high frequency and low frequency defects occurring in the printed material on the moving web.

5. The method of claim 1 wherein the step of generating said output generates an alarm indication.

6. The method of claim 1 wherein the step of generating said output generates a signal to said printing press.

* * * * *

UNITED STATES PATENT AND TRADEMARK OFFICE

CERTIFICATE OF CORRECTION

PATENT NO. : 5,144,566

DATED : September 1, 1992

INVENTOR(S) : John K. Anderson, et al.

It is certified that error appears in the above-identified patent and that said Letters Patent is hereby corrected as shown below:

Column 4, delete equation (3) and substitute therefore the following:

$$\rho = \frac{\sum \overline{H}_R \overline{H}_C}{\sqrt{\sum \overline{H}_R^2 \sum \overline{H}_C^2}} \qquad (3)$$

Signed and Sealed this

Fifth Day of October, 1993

Attest:

BRUCE LEHMAN

*Attesting Officer*

*Commissioner of Patents and Trademarks*